United States Patent [19]
Ogawa et al.

[11] 4,156,705
[45] May 29, 1979

[54] INCLINED SCREEN TRAY TOWER

[75] Inventors: Nobuyoshi Ogawa, Yokohama; Atsushi Tanaka, Kamakura, both of Japan

[73] Assignee: Nippon Kokan Kabushiki Kaisha, Tokyo, Japan

[21] Appl. No.: 917,403

[22] Filed: Jun. 20, 1978

[30] Foreign Application Priority Data

Jun. 23, 1977 [JP] Japan .................. 52-73893

[51] Int. Cl.² .......................... B01F 3/04
[52] U.S. Cl. ..................... 261/97; 261/106; 261/112; 261/114 R; 261/DIG. 9; 261/DIG. 72
[58] Field of Search .................. 261/94–98, 261/105, 106, 103, 110, 112, 114 R, 126, DIG. 72, DIG. 9; 202/158; 210/150, 151

[56] References Cited

U.S. PATENT DOCUMENTS

| | | | |
|---|---|---|---|
| 2,855,187 | 10/1958 | Rector | 261/114 R |
| 3,589,689 | 6/1971 | English | 261/114 R |
| 3,807,143 | 4/1974 | Dunn | 261/114 R X |
| 3,887,665 | 6/1975 | Mix et al. | 261/114 R |
| 4,014,962 | 3/1977 | Del Notario | 261/112 |
| 4,105,723 | 8/1978 | Mix | 261/105 |

FOREIGN PATENT DOCUMENTS 4791 of 1915 United Kingdom ............... 261/106

*Primary Examiner*—Richard L. Chiesa
*Attorney, Agent, or Firm*—Haseltine, Lake & Waters

[57] ABSTRACT

An inclined screen tray tower having one or more inclined screen trays, in which a liquid is passed downwardly onto said screen tray to form a film of said liquid on each of said screens and gas is passed through said liquid films so as to be absorbed by said liquid, characterized in that a plurality of cylinders are arranged side by side on each of said tray screens in such a manner that the longitudinal axis of each of said cylinders extends in the direction of inclination of each of said tray screens, each of said cylinders being made of a netting with metallic or synthetic resinous wires each arranged to make an angle of about 45° with the longitudinal axis of said cylinders.

3 Claims, 8 Drawing Figures

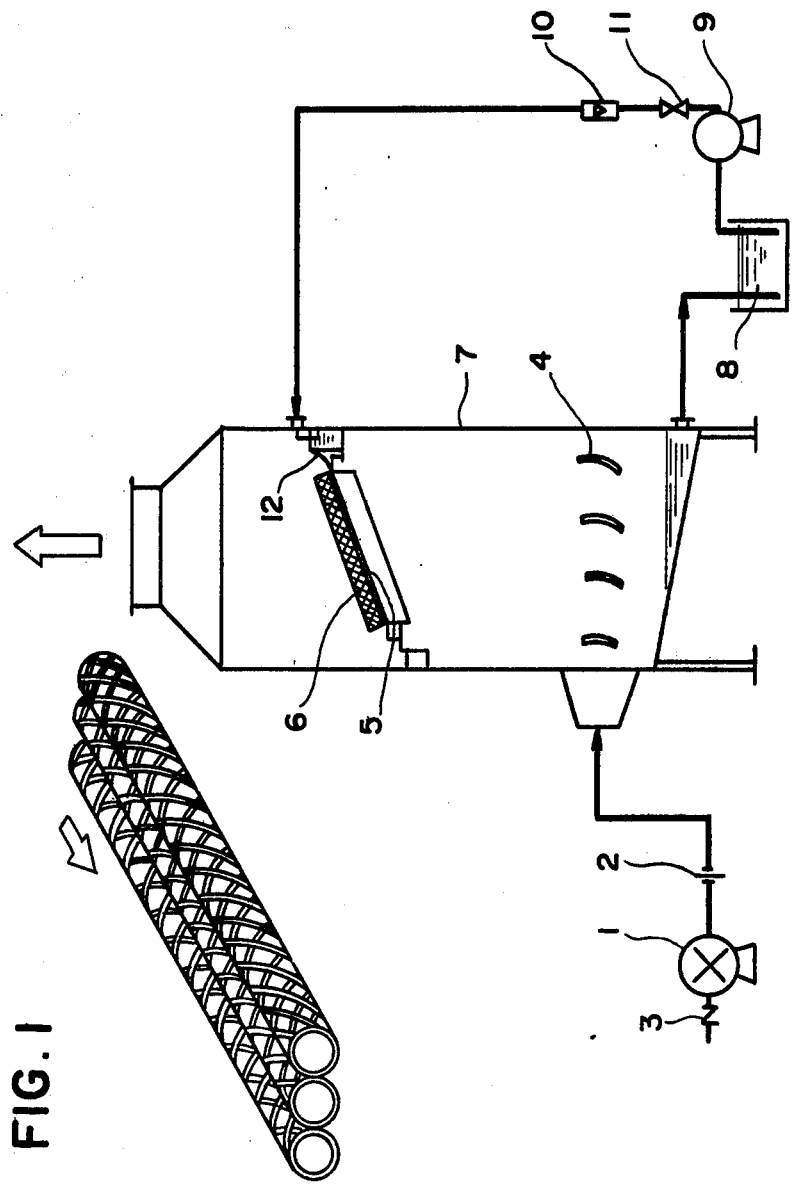

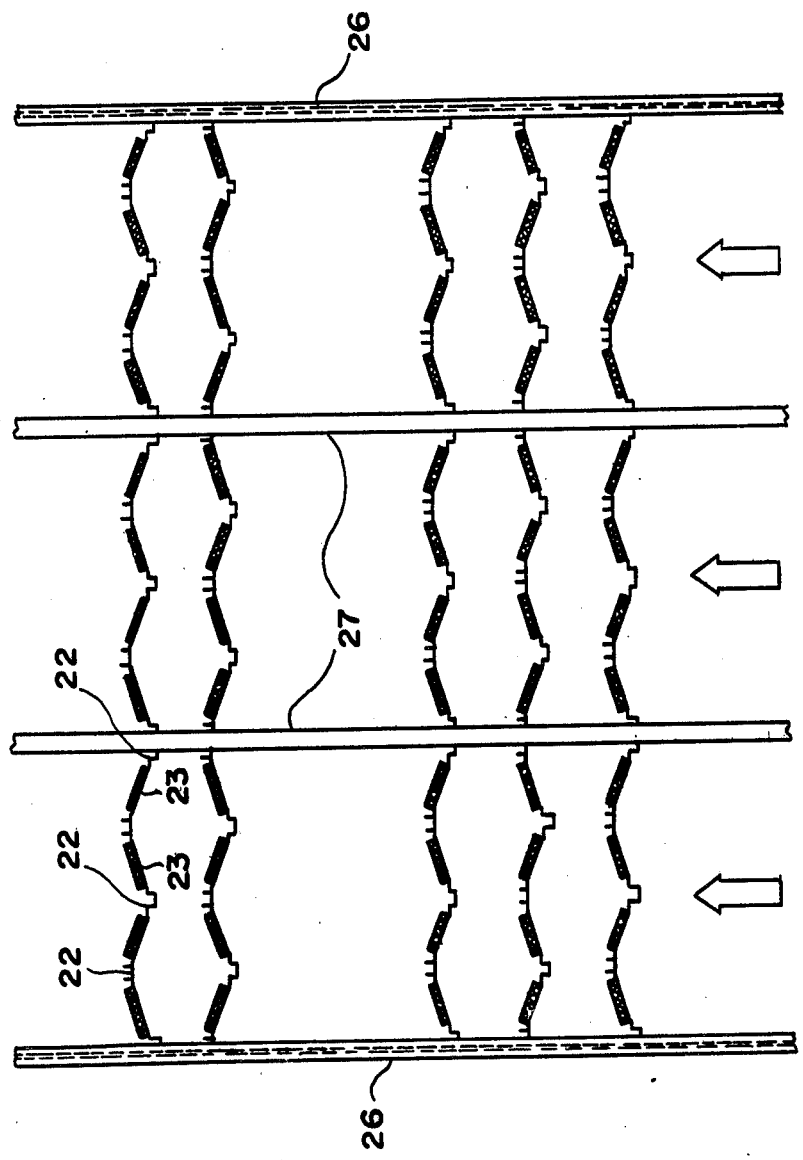

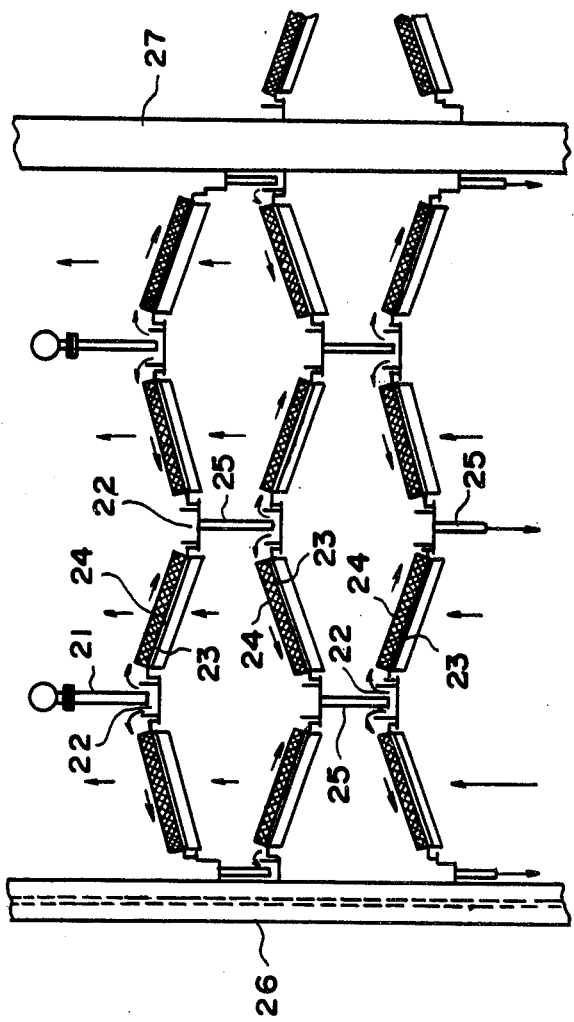

INCLINED SCREEN TRAY TOWER

BACKGROUND OF THE INVENTION

The present invention relates to an inclined screen tray tower having one or more inclined screen trays, whereby liquid is directed onto the screen tray to form a film of the liquid on each of screens and gas is passed through the liquid films. so as to be absorbed by the liquid.

In order to obtain improved gas absorption rates, packed towers have come into wide use in place of spray towers and the like. To obtain an improved gas-liquid contact efficiency, it has been the general practice to use as the packing any material having a large void volume, low resistance to gas flow and less tendency to cause deflections. With the packed towers of the type used for treating gas containing dust, etc., however, when the tower is operated for a long period of time, the packing will be clogged with the dust thus increasing the resistance to the gas flow within the tower and thereby causing a power loss, and eventually a point will be reached where the operation must be stopped to perform a packing cleaning operation or to remove, in extreme cases, the packing from the tower for cleaning.

To overcome these deficiencies, inclined screen tray towers have been proposed and used as absorption towers in which one or a plurality of stages of screen trays are provided, whereby liquid is directed downwardly onto the screen tray to form a film of the liquid on each screen and gas is passed upwardly through the liquid films to cause the liquid to flow, being bubbled by gas, along the surface of the inclined screens, thus increasing the gas-liquid contact efficiency. It has been proved that a tower of this type has an improved rate of absorption. With the tower of this type, for example, the angle of inclination of 5° to 20°, and screens of 5 to 20 meshes according to the Tyler standard screen scale have been proposed for the screen tray of the tower. With this tower, the angle of inclination and the screen opening of the screen tray are dependent on the type and flow rate of liquid and gas and the ratio between the flow rates. It is possible to obtain a satisfactory flow condition of liquid by suitably selecting the angle of inclination and the screen opening for the screen tray.

Even with this tower which is capable of ensuring a satisfactory flow condition of liquid with respect to certain design values, a variation in the amount of gas or liquid quantity tends to deteriorate the liquid flow condition and thereby to make it impossible to obtain the desired absorption efficiency. In other words, the ranges of flow rate of gas and liquid which are capable of ensuring a satisfactory flow condition of liquid and improved absorption efficiency are extremely narrow and limited.

Whilt it is considered that the range of tower operation can be increased by decreasing the screen opening, it is a disadvantage that a reduction in the screen opening tends to cause clogging of the screens with dust. On the other hand, while the screen opening must be increased to increase the flow rate of gas and thereby to increase the operating efficiency of the tower, if the screen opening is increased, the liquid will no longer be held in flowing condition bubbled by gas on the screens, causing the liquid to pass downwardly through the screens and thereby making it impossible to ensure a satisfactory absorption. To overcome this disadvantage, a method has been proposed in which a like screen is provided at a height of about 50 mm from the screens to provide a double-structure screen tray, and this method is also disadvantageous in that the construction is complicated, that the dust contained in gas tends to deposit and clog the packing layers and so on.

SUMMARY OF THE INVENTION

It is the object of the present invention to provide an inclined screen tray tower which is capable of increasing the flow rate of liquid and gas per unit area or increasing the operating efficiency of the tower, ensuring an improved absorption efficiency against variations in the flow rate of liquid or gas and preventing the occurrence of pressure loss due to clogging.

In accordance with the present invention there is provided an inclined screen tray tower having one or more inclined screen trays, in which a liquid is passed downwardly onto said screen tray to form a film of said liquid on each of said screens and gas is passed through said liquid films so as to be absorbed by said liquid, characterized in that a plurality of cylinders are arranged side by side on each of said tray screens in such a manner that the longitudinal axis of each of said cylinders extends in the direction of inclination of each of said tray screens, each of said cylinders being made of a netting with metallic or synthetic resinous wires each arranged to make an angle of about 45° with the longitudinal axis of said cylinders.

In accordance with a preferred embodiment of the inclined screen tray tower according to the invention, the angle of inclination of the screen tray is selected to range from 5° to 20° and each tray screen consists of a screen of 5 to 10 meshes according to the Tyler standard screen scale.

In accordance with another preferred embodiment of the inclined screen tray tower of this invention, each cylinder is made of a screen having a wire pitch of 5 to 15 mm and a cylinder diameter of 30 to 70 mm.

The inclined screen tray tower according to the invention will now be described in greater detail with reference to the illustrated embodiments and the accompanying drawings, and it should be noted that the cylinder diameter, the angle of inclination of inclined screen tray, the screen opening, the number and method of arrangement of screen trays, etc., of the inclined screen tray tower are not limited to those shown in the embodiments and drawings and that the proper range of values which would ensure a satisfactory absorption efficiency may be found and selected by suitably designing in dependence on the type of liquid and gas to be treated and changing the specification within the scope of the claims of this invention.

BRIEF DESCRIPTION OF THE DRAWING

FIG. 1 is a perspective view showing one form of the cylinders used with the invention.

FIG. 2 is a schematic diagram of a laboratory equipment.

FIG. 3 is a sectional view of the inclined screen trays used in an embodiment of the tower according to the invention.

FIG. 4 is a partial enlarged view of FIG. 3.

DETAILED DESCRIPTION OF THE INVENTION

Figure 5:
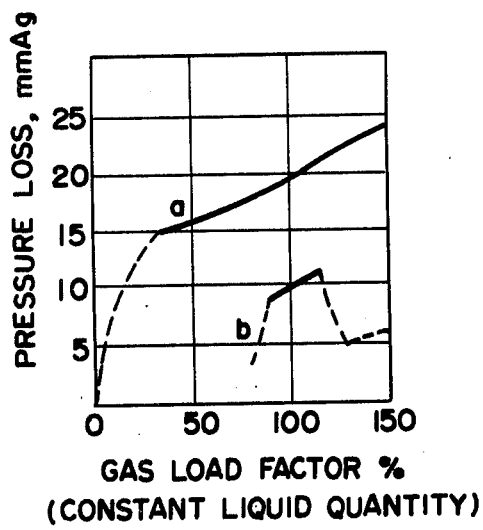
FIG. 5 and 6 are graphs showing the relationship between the pressure loss and the gas load factor with a constant liquid quantity and the liquid load factor with a constant gas quantity in the laboratory equipment shown in FIG. 2.

Referring now to FIG. 1, there is illustrated one form of the cylinders used in the inclined screen tray tower of this invention. Each cylinder comprises a netting which is made of metallic or synthetic resinous wires each arranged to make an angle of about 45° with the longitudinal axis of the cylinder. The metal may for example be non-rusting steel, e.g., stainless or any other corrosion resistant metal, and the synthetic resin may for example be a material usually used as a packing for the packed towers, e.g., polypropylene or vinyl chloride. The wire pitch of the cylinders should preferably be in the range of 5 to 15 mm, and the cylinder diameter should preferably be in the range of 30 to 70 mm. If the wire pitch is selected smaller than the above-mentioned range, the pressure loss will be increased, although the liquid-gas contact efficiency may be improved, whereas a wire pitch greater than the said range is not desirable since it gives rise to phenomena which are reverse the previous case. On the other hand, if the cylinder diameter is selected smaller than the above-mentioned range, the pressure loss will be increased. On the contrary, if the cylinder diameter is selected greater than the said range, the contact efficiency will be deteriorated, although the pressure loss can be decreased. In accordance with the embodiment of the invention, each of the cylinders used is one manufactured by using polypropylene wires having an elliptical sectional area of 5×7 mm, weaving the wires into a screen in such a manner that the wires make an angle of about 45° with the longitudinal axis of cylinder and thereby forming a cylinder having an outer diameter of 55 mm, inner diameter of 40 mm and length of 1 m. As shown in FIG. 1, a plurality of the cylinders are arranged side by side on each tray screen in such a manner that the longitudinal axis of each cylinder extends in the direction of inclination of the tray screen. In FIG. 1, the arrow indicates the direction of inclination of the tray screen.

With the tower of this invention, a preferred angle of inclination for the inclined screen tray having the cylinders arranged side by side thereon is in the range of 5° to 20°, and a preferred screen opening is in the range of about 2 to 4 mm or in the range of 5 to 10 meshes in terms of the Tyler standard screen scale. On the other hand, if the length of the inclined screen tray in the direction of inclination or the length of the cylinders is greater than about 1.5 m, a range of preferred flow rates of gas and liquid will be limited considerably even if the other conditions are suitably selected, and thus the length should preferably be selected smaller than about 1.5 m. There is no need to set any limit to the width of the inclined screen tray so far as the blowing of gas and the downward flow of liquid can be effected uniformly.

Next, the effect of the inclined screen tray in the tower of this invention will be described with reference to the results of the experiments conducted in comparison with the prior art inclined screen tray. FIG. 2 is a schematic view of the equipment used for performing these experiments.

Figure 6:
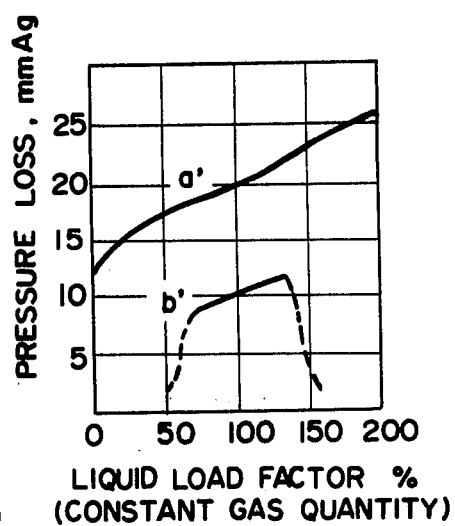

Referring to FIG. 2, the air flow delivered from a blower 1 is measured by an orifice 2 so that the air flow is regulated to a desired value by a suction damper 3 and the air is then supplied into an absorption tower proper 7. When supplied into the tower, the air is rectified by movable dispersion plates 4 to eliminate deflections and then the air is passed upwardly through an inclined screen tray 5 having an angle of inclination of 15° so as to be discharged to the outside. The inclined screen tray has a wire screen having a width of 0.9 m, a length of 1.13 m, an effective area of 1 $m^2$ and an opening of 10 meshes and set in the screen tray. 17 units of a cylinder 6 of the construction described previously are fixedly arranged side by side on the inclined screen tray 5. The liquid contained in a circulation tank 8 is pumped out by a circulating pump 9, measured by a flow meter 10 and regulated by a delivery value 11 to circulate a desired amount of flow. This circulating liquid is supplied to a trough 12 mounted in the absorption tower and the liquid is overflown from the trough 12 onto the inclined screen tray 5. In this case, the liquid comes into a gas-liquid contact with gas which is upwardly passed through the inclined screen tray 5 thus causing a varying flow condition. This liquid flow condition is observed through two windows made of transparent vinyl chloride and arranged on two sides of the absorption tower proper 7. Air and service water were respectively used as the gas and the circulating liquid. With this laboratory equipment, standard quantities of gas and liquid per screen area of 1 $m^2$, i.e., gas quantity of 7,500 $Nm^3/H$ and liquid flow rate of 4.2 $m^3/H$ were present. The liquid flow condition and the pressure loss by varying these present values were observed and measured to obtain an operable limiting range. FIG. 5 and Table 1 and FIG. 6 and Table 2 respectively show the resulting gas liquid contact conditions and pressure losses in the case where the gas quantity was varied while maintaining the liquid quantity at the preset value and in the case where the liquid quantity was varied while maintaining the gas quantity at the preset value. FIG. 5 shows the relationship between the gas load factor and the pressure loss, and in the figure lines a and b are respectively a graph showing the results obtained with an inclined screen tray employing cylinders produced according to the teaching of this invention and a graph showing the results obtained with the prior art inclined screen tray, with the solid lines each showing a range of satisfactory gas-liquid contact and the broken lines each showing a range of unsatisfactory gas-liquid contact. FIG. 6 shows the relationship between the liquid load factor and the pressure loss, and lines a' and b' are graphs which are respectively similar to the lines a and b in FIG. 5.

Table 1

| Pressure Loss and Gas-Liquid Contact Conditions with Constant Liquid Quantity | | | | | | | | | |
|---|---|---|---|---|---|---|---|---|---|
| Gas flow rate $10^3 Nm^3/H$ | 1.5 | 2.25 | 3.75 | 5.3 | 6.75 | 7.5 | 8.25 | 9.75 | 11.25 |
| Load factor % | 20 | 30 | 50 | 70 | 90 | 100 | 110 | 130 | 150 |
| Inclined screen Pressure loss in | 2 | 15 | 16 | 17 | 18 | 20 | 22 | 23 | 24 |

Table 1-continued

Pressure Loss and Gas-Liquid Contact Conditions with Constant Liquid Quantity

| | | | | | | | | | |
|---|---|---|---|---|---|---|---|---|---|
| tray of the invention | water gauge pressure (mm) Gas-liquid contact condition | N | G | G | G | G | G | G | G |
| Conventional inclined screen tray | Pressure loss in water gauge pressure (mm) | | | 2 | 2 | 9 | 10 | 11 | 5 | 6 |
| | Gas-liquid contact condition | | | N | N | G | G | G | N | N |

N: means that the condition is not good.
G: means that the condition is good.

Table 2

Pressure Loss and Gas-Liquid Contact Conditions with Constant Gas Quantity

| | | | | | | | | | | |
|---|---|---|---|---|---|---|---|---|---|---|
| Liquid flow rate m³/H | | 0 | 0.8 | 2.1 | 2.9 | 4.2 | 5.5 | 6.3 | 7.6 | 8.4 |
| Load factor % | | 0 | 20 | 50 | 70 | 100 | 130 | 150 | 180 | 200 |
| Inclined screen tray of the invention | Pressure loss in water gauge pressure (mm) | 10 | 14 | 18 | 19 | 20 | 22 | 23 | 25 | 26 |
| | Gas-liquid contact condition | | G | G | G | G | G | G | G | G |
| Conventional inclined screen tray | Pressure loss in water gauge pressure (mm) | | | 2 | 8 | 10 | 12 | 2 | | |
| | Gas-liquid contact condition | | | N | G | G | G | N | | |

It will be seen from the above-mentioned experimental results that when the conventional inclined screen tray was used, a satisfactory liquid flow condition was obtained only in the variation range of 90 to 110% of the preset value of the gas load. Here, the term satisfactory liquid flow condition represents one in which the liquid flows in the direction of inclination of the screen while being bubbled by gas over the surface of the inclined screen and if the variation of the gas load is not within this range, a phenomenon will be caused in which the liquid is passed downwardly through the screen or the liquid is blown up by the gas, thus considerably deteriorating the contact between the gas and liquid. In the case where the inclined screen tray of this invention was used and the load was varied, a satisfactory gas-liquid contact condition was obtained when the loads were varied in the range between 30 and 150% of the preset values.

Referring now to FIGS. 3 and 4, the inclined screen tray tower of this invention as applied to an actual operation of treating sulfur dioxide containing gas discharged from a sintering machine will now be described.

The absorption tower has a height of 38 m, length of 19 m and width of 9 m. As shown in FIG. 3, five stages of inclined screen trays are arranged within the tower. For purposes of simplification in installation inside the absorption tower, each tray was produced by preparing a number of unit screens each preliminarily set in a frame and having a dimension of 0.95×1.1m, and connecting the unit screens with one another and to troughs. The effective area of each unit screen is about 1 m² and it consists of a metal screen prepared by arranging SUS 316 stainless steel wires of 0.96 mm diameter, 10 wires per inch. Each stage was constructed by connecting ten unit screens with one another in the width direction to form a row (each corresponding to numeral 23 in FIG. 3) and by connecting the resulting twelve rows with one another in such a manner that the adjacent rows are inclined in the opposite directions at an inclination angle of 15° with a trough 22 interposed therebetween as shown in FIG. 3. The total effective area of the screens in each stage is about 120 m². In FIG. 3, numeral 26 designates the side walls of the absorption tower, and 27 posts which are arranged at suitable intervals to support the trays. In the Figures, the arrows indicate the direction of flow of gas and liquid. Although not shown, there are provided means which are equivalent to the dispersion plates 4 shown in FIG. 2.

Cylinders 24 of the construction mentioned previously were arranged side by side on the inclined screens 23, 17 cylinders per unit screen, in such a manner that the longitudinal axis of each cylinder extends in the direction of inclination of the inclined screen, and the cylinders were then fixedly mounted on the screen.

An absorbing solution or ammonium sulfite solution was circulated at a rate of 750 to 1,000 m³/H to the absorption tower, and an exhaust gas discharged from a sintering machine and containing 35 ppm of sulfur dioxide was supplied into the tower by a blower at a rate of $76 \times 10^4 Nm^3/H$.

The absorbing solution was brought into a satisfactory flowing condition over the inclined screen trays by the gas and thus the absorbing solution was brought into contact with the gas thus absorbing it. The flow paths of the absorbing solution and the exhaust gas will now be described with reference to the enlarged view of FIG. 4. The absorbing solution is circulated in the similar manner as in the case of FIG. 2. The absorbing solution is passed downwardly into the troughs 22 through chute nozzles 21, overflows from the troughs 22, flows down being bubbled by gas on the inclined screen 23, is gathered in the lower troughs 22 and enters through down pipes 25 into the troughs 22 of the next stage from which the absorbing solution overflows again. In this way, the absorbing solution flows downwardly into the troughs 22 of the succeeding stages and finally gathered, in the bottom of the absorption tower from which the absorbing solution is delivered to the outside of the tower and gathered in a circulating tower. The absorbing solution gathered in the circulating tank is again pumped out by a pump for recirculation. In this manner, the absorbing solution remains in satisfactory flowing condition over all of the inclined screens in the tower. On the other hand, the exhaust gas is introduced upwardly from the lower portion of the absorption tower in the similar manner as in the case of FIG. 2, so that the gas is dispersed by the movable dispersion plates and consequently gas is uniformly passed upwardly within the tower without any deflections. The upwardly moving gas passes through the inclined screens 23, so that while coming into contact fully with the absorbing solution in satisfactory flowing condition on the screens, the gas successively passes upwardly through the higher stage inclined screens 23 to contact with the absorbing solution in the similar manner and the gas finally gathers in the upper portion of the tower from which the gas is discharged to the outside. The sulfur dioxide in the exhaust gas is absorbed by the absorbing solution when they contact with each other.

Figure 7:
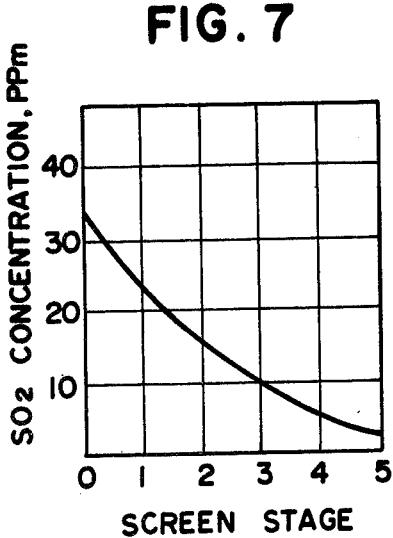
FIGS. 7 and 8 are graphs showing respectively the sulfur dioxide content of gas at the outlets of the inclined screen trays and the variation with time of the tower internal pressure in the embodiment of the invention.
Figure 8:
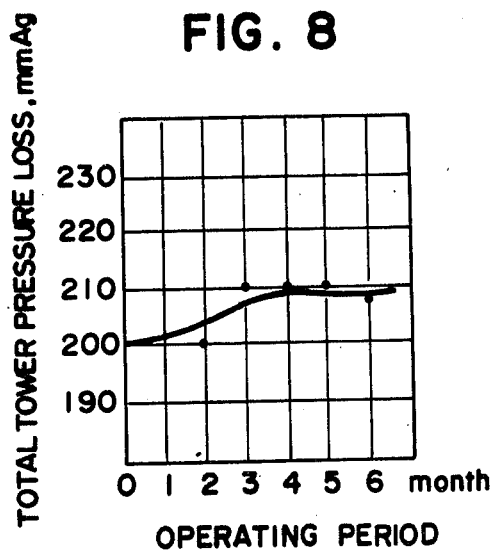

The results obtained with this embodiment are shown in FIG. 7 and Table 3 respectively showing the sulfur dioxide concentration and absorption rate at the respective stages as well as in FIG. 8 and Table 4 showing the variation in pressure loss with time.

Table 3

| | Variation in Sulfur Dioxide Concentration at Respective Stages | | | | | |
|---|---|---|---|---|---|---|
| Stage | inlet | 1st stage outlet | 2nd stage outlet | 3rd stage outlet | 4th stage outlet | 5th stage outlet |
| SO$_2$ Concentration (ppm) | 35 | 24 | 16 | 10 | 5 | 2 |
| Absorption rate (%) | 0 | 31.4 | 54.3 | 71 | 85 | 94 |

Table 4

| | Variation in Pressure Loss with Time | | | | | | |
|---|---|---|---|---|---|---|---|
| No. of days | Initial period | 30 | 60 | 90 | 120 | 150 | 180 |
| Total pressure loss of absorption tower in water gauge pressure (mm) | 200 | 200 | 200 | 210 | 210 | 210 | 210 |
| Increasing rate in pressure hour (%) | 0 | 0 | 0 | 5 | 5 | 5 | 5 |

As shown in Table 3, the fact that the sulfur dioxide content was extremely low in the gases discharged from the absorption tower after treatment was due to the effect of this invention employing the incline screen trays having the cylinders arranged thereon, and this fact proves that a satisfactory contact was provided between the gas and the solution. Also, the fact that the increasing rate of pressure loss in the tower was very low and there was practically no increase in the overall pressure loss in the tower at the expiration of 6 months after the beginning of the operation, is an indication that the clogging due to the dust was insignificant.

On the other hand, sulfur dioxide absorption experiments were conducted in the above-mentioned manner by supplying the exhaust gas containing 216 ppm of sulfur dioxide on an average at a rate of $42 \times 10^4 Nm^3/H$ and circulating ammonium sulfite solution at a rate of 640 m$^3$/H. The results of the experiments showed that the flowing condition of the solution on the trays was satisfactory, that the solution was brought into satisfactory contact with the gas and that the SO$_2$ concentration and absorption rate at the Outlte of the fifth stage were respectively 4.5 ppm and about 98%. The change of pressure loss with time due to the continuous use was significant as was the case with the previously mentioned embodiment.

It will thus be seen that the inclined screen tray absorption tower of this invention has an extremely excellent gas absorbing effect as mentioned previously and the present invention is capable of making a great contribution toward eliminating the harmful effects on the environment of the exhaust gases containing noxious constituents.

We claim:

1. An inclined screen tray tower having one or more inclined screen trays, in which a liquid is passed downwardly onto said screen tray to form a film of said liquid on each of said screens and gas is passed through said liquid films so as to be absorbed by said liquid, characterized in that a plurality of cylinders are arranged side by side on each of said tray screens in such a manner that the longitudinal axis of each of said cylinders extends in the direction of inclination of each of said tray screens, each of said cylinders being made of a netting with metallic or synthetic resinous wires each arranged to make an angle of about 45° with the longitudinal axis of said cylinders.

2. An inclined screen tray tower according to claim 1, wherein the angle of inclination of said screen tray is in the range between 5° and 20°, and wherein each said screen is a screen of 5 to 20 meshes according to the Tyler standard screen scale.

3. An inclined screen tray tower according to claim 2, wherein each said cylinder is made of a screen having a wire pitch in the range between 5 and 15 mm, and wherein each said cylinder has a diameter in the range between 30 and 70 mm.

* * * * *